United States Patent [19]

Hermens et al.

[11] Patent Number: 5,706,069
[45] Date of Patent: Jan. 6, 1998

[54] LIQUID CRYSTAL DISPLAY DEVICE HAVING A SEALING EDGE CIRCUMFERENTIALLY PROVIDED WITH PROTRUSIONS AND METHOD FOR MANUFACTURING A NUMBER OF LIQUID CRYSTAL DISPLAY DEVICES

[75] Inventors: Hendrik C.M. Hermens; Alexander V. Henzen, both of Heerlen, Netherlands; Chak Seng Leung, Tsuen Wan, Hong Kong; Joseph M.J. Rijken, Heerlen, Netherlands

[73] Assignee: U.S. Philips Corporation, New York, N.Y.

[21] Appl. No.: 781,553

[22] Filed: Jan. 9, 1997

Related U.S. Application Data

[63] Continuation of Ser. No. 366,338, Dec. 28, 1994, abandoned.

[30] Foreign Application Priority Data

Jan. 1, 1994 [EP] European Pat. Off. ............ 94200001

[51] Int. Cl.$^6$ ................................................. G02F 1/1339
[52] U.S. Cl. ........................................ 349/153; 349/190
[58] Field of Search .......................... 359/80, 81; 349/153, 349/155, 190

[56] References Cited

U.S. PATENT DOCUMENTS

| | | | |
|---|---|---|---|
| 4,094,058 | 6/1978 | Yasutake et al. | 29/592 |
| 4,202,606 | 5/1980 | Wild | 350/336 |
| 4,255,848 | 3/1981 | Freer et al. | 349/190 |
| 4,308,533 | 12/1981 | Schmidt | 359/80 |
| 5,037,185 | 8/1991 | Grupp | 359/80 |

FOREIGN PATENT DOCUMENTS

| | | | |
|---|---|---|---|
| 64-61731 | 3/1989 | Japan | 359/80 |
| 2274723 | 8/1994 | United Kingdom | G02F 1/1339 |

OTHER PUBLICATIONS

IBM Technical Disclosure Bulletin, vol. 32, No. 7, Dec. 1989, Seal Design for Liquid Crystal Display.

*Primary Examiner*—William L. Sikes
*Assistant Examiner*—Charles Miller
*Attorney, Agent, or Firm*—John C. Fox; Norman N. Spain

[57] ABSTRACT

A liquid crystal display device (LCD) comprises two supporting plates (1, 2) which are interconnected by means of a sealing edge (3) and enclose a layer of liquid crystalline material (4). Inter alia, for an improved support upon scratching and breaking of the device, the sealing edge (3) is circumferentially provided with protrusions (3A–3D) which extend from the sealing edge (3) substantially to the edge (11) of at least one of the two supporting plates (1, 2).

5 Claims, 1 Drawing Sheet

LIQUID CRYSTAL DISPLAY DEVICE HAVING A SEALING EDGE CIRCUMFERENTIALLY PROVIDED WITH PROTRUSIONS AND METHOD FOR MANUFACTURING A NUMBER OF LIQUID CRYSTAL DISPLAY DEVICES

This is a continuation of application Ser. No. 08/366,338, filed Dec. 28, 1994, now abandoned.

BACKGROUND OF THE INVENTION

The invention relates to a liquid crystal display device (LCD) comprising a first supporting plate which is provided with at least one picture electrode and a second supporting plate which is provided with at least one counter electrode, both plates enclosing a layer of liquid crystalline material which is circumferentially bounded by a sealing edge by means of which both supporting plates are interconnected.

The invention also relates to an method for manufacturing a number of liquid crystal display devices.

A method of manufacturing a liquid crystal display device usually starts from two flat glass plates, with the pattern of the picture electrode(s) of the liquid crystal display device being provided in a multiple number on the one glass plate and the other glass plate also comprising the pattern of the counter electrode(s) in a multiple number. Each individual electrode pattern on one of the two glass plates is circumferentially provided with a sealing edge which locally has a filing aperture. The two glass plates are subsequently aligned with respect to each other in order that a complete counter electrode pattern is located opposite each picture electrode pattern, and subsequently they are interconnected by means of the sealing edges. After the sealing edge has been cured, individual cells are opened up in the plates by means of scratching and breaking, which cells are subsequently filled with liquid crystalline material via the filling aperture.

In practice, notably scratching and breaking of the glass plates to form separate cells appears to lead to rejects and thus to a lower production output. In some cases, the mechanical forces exerted on the glass plates during scratching and breaking lead to breakage of the glass plate so that, in the extreme case, all cells are destroyed.

OBJECTS AND SUMMARY OF THE INVENTION

It is, inter alia an object of the invention to provide a liquid crystal display device of the type described in the opening paragraph whose cell is less sensitive to breakage upon scratching and breaking of the glass plates from which the cell is made.

To this end a liquid crystal display device according to the invention is characterized in that the sealing edge is circumferentially provided with protrusions which extend from the sealing edge substantially to the edge of at least one of the two plates. The protrusions extend up to the proximity of the scratch lines along which the glass plates are broken and thus provide a better support when the glass plates are scratched and broken. By using the invention, the number of rejects due to glass breakage in this process step is thus reduced considerably.

In a special embodiment of the liquid crystal display device the sealing edge comprises a conducting material and provides an electric through-connection between a counter electrode and a conductor track which is present on the first supporting plate, while at least one of the protrusions is present at the area of the overlap between the relevant counter electrode and the relevant conductor track. Thus, a larger contact surface area between the conductor track and the counter electrode is realised, which leads to a lower series resistance of the through-connection. On the other hand, a smaller lateral size of the through-connection is sufficient for the same series resistance, so that the mutual pitch of the through-connection with possible other, similar through-connections can be reduced.

In a preferred embodiment at least one further protrusion is provided between the filling aperture and the protrusion(s) ensuring the contact between the conductor track and the counter electrode. Usually, the filling aperture is sealed with an UV curing paste after the cell has been filled. The shrinkage occurring when the paste is cured would normally constitute a given mechanical load of the electric contact of the counter electrode if in conformity with this preferred embodiment of the invention at least one further protrusion absorbing said load were not provided between the protrusion(s) providing the electrical connection and the filling aperture. Consequently, a more reliable connection of the counter electrode is achieved.

A problem which may occur when the cell is filled is that liquid crystalline material is sucked up in a capillary manner in the gap between the two supporting plates outside the sealing edge. To inhibit this phenomenon, a further special embodiment of the liquid crystal display device according to the invention is characterized in that a further protrusion extending to the edge of at least one of the two supporting plates is provided at both sides of the tilting aperture. These further protrusions constitute an adequate barrier against a possible parasitic, capillary stream of liquid along the edge of the cell.

The invention is also embodied in a method for manufacturing a number of liquid crystal display devices comprising a cell having a first supporting plate which is provided with at least one picture electrode and a second supporting plate which is provided with at least one counter electrode, both plates enclosing a layer of liquid crystalline material which is circumferentially bounded by a sealing edge by means of which both supporting plates are interconnected, wherein a supporting plate is provided with a multiple number of electrode patterns each provided with a sealing edge, another supporting plate is provided with a multiple number of counter electrodes, the two supporting plates are subsequently aligned with respect to each other and subsequently are interconnected by means of the sealing edges, whereafter the sealing edges are cured, and whereafter individual cells are manufactured by means of scratching and breaking along scratch lines, which cells are subsequently filled with liquid crystalline material, in which said sealing edges have protrusions that extend up to the proximity of said scratch lines along which the supporting plates are broken.

BRIEF DESCRIPTION OF THE DRAWING

These and other aspects of the invention will be apparent from and elucidated with reference to the embodiments described hereinafter.

The drawing is diagrammatic and not to scale. Particularly, some dimensions are exaggerated for the sake of clarity.

DESCRIPTION OF THE PREFERRED EMBODIMENTS

Figure 1:
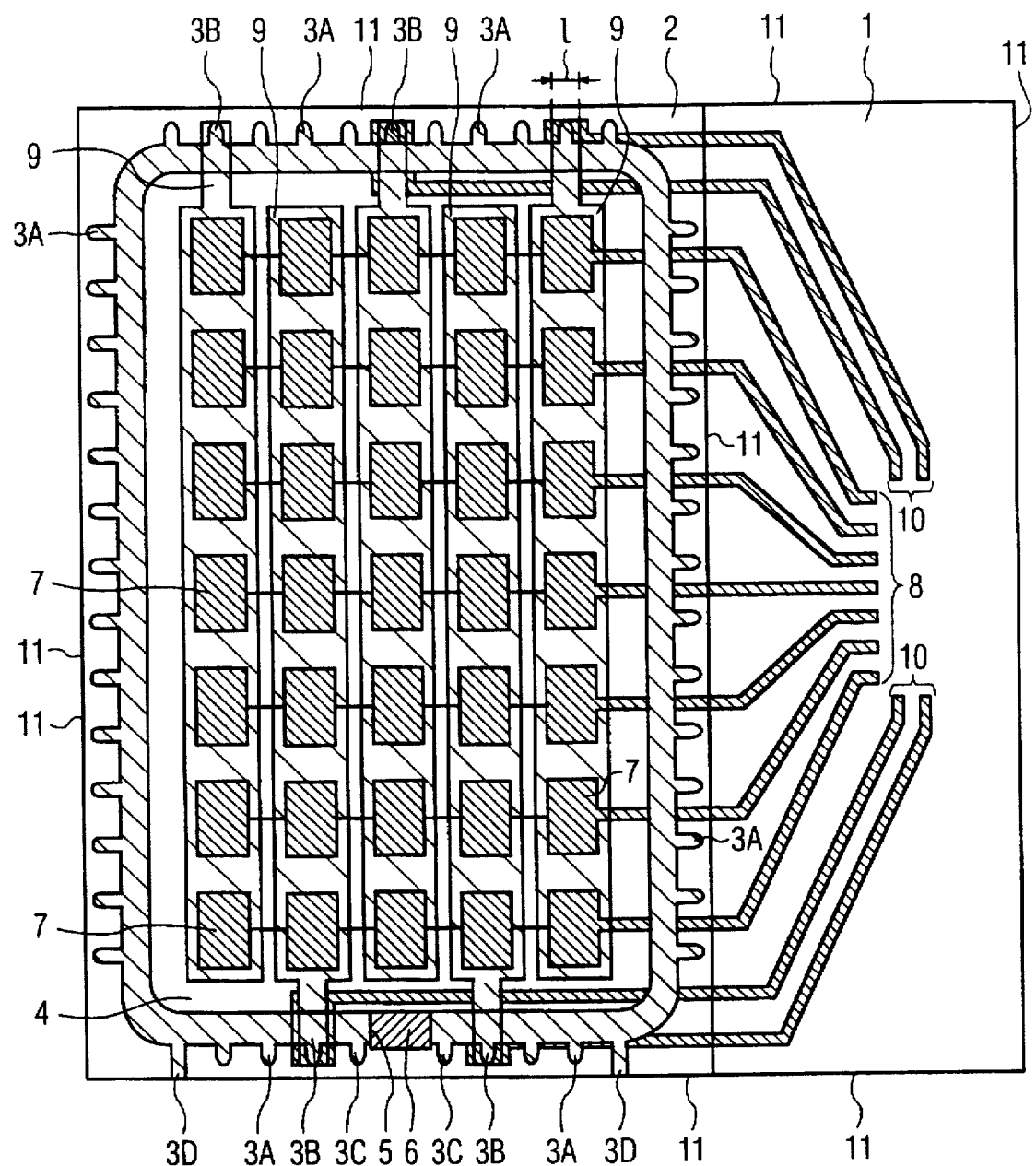

The liquid crystal display device (LCD) shown comprises a first supporting plate 1 and a second supporting plate 2, both of glass, which are interconnected by means of a sealing edge 3 and enclose a layer of liquid crystalline material 4. The liquid crystalline layer 4 is circumferentially bounded by the sealing edge 3 and is provided between the two supporting plates 1, 2 via a filling aperture 5, whereafter the filling aperture 5 is hermetically sealed by means of a stop 6 of UV-curing glue, for example an acrylic resin.

The first supporting plate 1 is provided with a matrix of five rows and seven columns of substantially transparent picture electrodes 7 of indium-tin oxide or, if desired, another suitable transparent conductor. The picture electrodes 7 are interconnected per column, which for the sake of clarity is shown only diagrammatically in the FIGURE. The columns of picture electrodes can be separately driven by means of seven conductor tracks 8 which are also substantially transparent.

A plurality of strip-shaped counter electrodes 9 each overlapping a row of picture electrodes 7 is provided on the opposite supporting plate 2. The counter electrodes may be individually driven via conductor tracks 10 which are provided on the first supporting plate and are connected to the counter electrodes 9 via the sealing edge. To this end, the sealing edge is provided with an electrically conducting material which is homogeneously distributed therein so that only in the vertical direction, i.e. the direction transverse to the supporting plates 1, 2, but not in the lateral direction parallel to the supporting plates 1, 2, an electrical connection is formed. Due to this anisotropic conductance of the sealing edge 3, the counter electrodes 9 are electrically insulated from each other.

The device comprises two relatively large glass plates in which the pattern of the counter electrodes 7 and the conductor tracks 8, 10 together with the sealing edge 3 is imaged in a multiple number on the one glass plate and the other glass plate is provided with the pattern of the counter electrodes in a multiple number. Moreover, the two glass plates comprise the necessary insulation, passivation and orientation layers and possibly spacers which are not separately shown for the sake of clarity in the FIGURE but are completely clear to those skilled in the art. The facing sides of the glass plates provided with electrodes are aligned with respect to each other so that the counter electrodes 9 are located exactly opposite the rows of picture electrodes 7 in each device and are subsequently clamped onto each other. The sealing edge 3 subsequently provides a permanent connection of the two glass plates, free from leakage. Thus, a large number of similar liquid crystal display devices is manufactured simultaneously, whereafter the (still) empty cells are obtained from the glass plates by scratching and breaking. The edges 11 of the supporting plates 1, 2 correspond to the scratch lines which are provided on the glass plates for this purpose.

During scratching and breaking of the glass plates, one or both glass plates may sometimes break due to the relatively large mechanical forces exerted on the glass plates, which in extreme cases leads to reject of the complete plate with cells. To inhibit this phenomenon, the sealing edge 3 according to the present invention is circumferentially provided with protrusions 3A, 3B, 3C, 3D which extend from the sealing edge 3 substantially to the scratch lines 11, i.e. substantially to the edge 11 of at least one of the two supporting plates 1, 2. The protrusions give the glass plates optimum support during scratching and breaking, so that breakage of one of the glass plates is reduced to a minimum. The invention does not impose special requirements on the material and the composition of the sealing edge. Consequently, any conventional material may be used for the sealing edge and the sealing edge 3 together with the protrusions 3A–D may be provided in a conventional manner, for example by means of a silk-screening technique or flexo-printing. The invention thus does not require any modification or extension of the process of manufacturing the device. Preferably, the sealing edges 3 are made in one piece and of one material.

In addition to their function as a support, some protrusions 3B–D have a further function. For example, the protrusions 3B which are situated at the area of the overlap of the counter electrodes 9 and the associated conductor tracks 10 on the first supporting plate 1 enlarge the contact surface area between both plates, which leads to a lower series resistance with an equal lateral size 1 of the through-connection.

The protrusions 3C between the filling aperture 5 and the protrusions 3B located further remote and contributing to the electrical through-connection of the counter electrodes 9 ensure a mechanical relief of the load on these through-connections. This is notably important because the UV-curing glue 6 used for sealing the filling aperture 5 has shrunk during curing. The protrusions 3C appear to be able to compensate the tensile forces due to this shrinkage at least to a large extent, which leads 1 to a more reliable connection of the counter electrodes 9. Instead of one protrusion, a plurality of such protrusions 3C may be provided so as to resist larger tensile forces.

Moreover, the sealing edge 3 has a protrusion 3D at both sides of the filling aperture 5, which protrusion extends entirely to the edge 11 of the supporting plates 1, 2. These protrusions constitute an adequate barrier against possible parasitic, capillary streams of liquid in the gap which is formed by the supporting plates 1, 2 and is internally bounded by the sealing edge. Consequently, liquid crystalline material is prevented from being sucked up in a capillary manner along the edge of the supporting plates 1, 2 when the cell is filled, which would otherwise not only lead to waste of liquid crystalline material but also to contamination of the cells.

Although the invention has been elucidated with reference to one embodiment and an associated drawing, it will be evident that it is by no means limited to the embodiment shown and that those skilled in the art will be able to conceive many variations and forms within the scope of the invention.

For example, in addition to passive devices, in which the picture electrodes are directly driven from the exterior, the invention may also be used for active devices in which active (semiconductor) switching elements are integrated within the image plane and with which the picture electrodes are driven. Within the scope of the invention the terms of picture electrode and counter electrode should be considered to have a wide and non-limitative meaning. For example, a picture electrode which is internally or not internally switched may be interconnected to a conductor track on the second supporting plate via the sealing edge, while in conformity with a special embodiment of the invention a further protrusion at the location of the through-connection provides a larger contact surface area. Moreover, within the scope of the invention, a liquid crystalline material is not only understood to be purely liquid crystalline material but also liquid crystalline material dispersed in a polymer or forming a combined system or network with a polymer in a different manner.

Generally, the invention provides a liquid crystal display device providing an improved support by the supporting plates so that, inter alia the number of rejects due to glass breakage upon scratching and breaking of the glass plates used as a starting material is reduced to a minimum.

We claim:

1. A liquid crystal display device comprising a first supporting plate which is provided with at least one picture electrode and a second supporting plate which is provided with at least one counter electrode, both plates enclosing a layer of liquid crystalline material which is circumferentially bounded by a sealing edge by means of which both supporting plates are interconnected, characterized in that the sealing edge is circumferentially provided with protrusions which extend from the sealing edge substantially to essentially the complete edge of at least one of the two plates.

2. A liquid crystal display device as claimed in claim 1, characterized in that the sealing edge comprises an electrically conducting material, in that a counter electrode is connected to a conductor track on the first supporting plate by means of the sealing edge and in that at least one of the protrusions is present at the area of the overlap between the counter electrode and the conductor track.

3. A liquid crystal display device as claimed in claim 2, characterized in that the sealing edge is locally provided with a filling aperture and in that at least one further protrusion is present between the at least one protrusion and the filling aperture.

4. A liquid crystal display device as claimed in claim 3, characterized in that a further protrusion extending to the edge of at least one of the two supporting plates is provided at both sides of the filling aperture.

5. Method for manufacturing a number of liquid crystal display devices comprising a cell having a first supporting plate which is provided with at least one picture electrode and a second supporting plate which is provided with at least one counter electrode, both plates enclosing a layer of liquid crystalline material which is circumferentially bounded by a sealing edge by means of which both supporting plates are interconnected, wherein a supporting plate is provided with a multiple number of electrode patterns each provided with a sealing edge, another supporting plate is provided with a multiple number of counter electrodes, the two supporting plates are subsequently aligned with respect to each other and subsequently are interconnected by means of the sealing edges, whereafter the sealing edges are cured, and whereafter individual cells are manufactured by means of scratching and breaking along scratch lines, which cells are subsequently filled with liquid crystalline material, in which said sealing edges are circumferentially provided with protrusions that extend essentially to the proximity of essentially said complete scratch lines along which the supporting plates are broken.

* * * * *